United States Patent
Garrood et al.

[15] 3,657,593
[45] Apr. 18, 1972

[54] ELECTRON MICROSCOPY

[72] Inventors: John Robert Garrood, Emmanuel College; William Charles Nixon, 2 Causewayside, few Causeway, both of Cambridge, England

[22] Filed: Apr. 3, 1969

[21] Appl. No.: 813,241

[30] Foreign Application Priority Data
Apr. 3, 1968 Great Britain.................15,933/68

[52] U.S. Cl....................................315/18, 313/77
[51] Int. Cl.........................................H01j 29/80
[58] Field of Search..............................313/77; 315/18

[56] References Cited

UNITED STATES PATENTS

| | | | |
|---|---|---|---|
| 2,672,575 | 3/1954 | Werenfels | 315/21 |
| 2,675,501 | 4/1954 | Friend | 313/77 X |
| 2,803,781 | 8/1957 | Jurgens | 313/77 X |

Primary Examiner—Rodney D. Bennett, Jr.
Assistant Examiner—Brian L. Ribando
Attorney—Scrivener, Parker, Scrivener and Clarke

[57] ABSTRACT

In scanning electron beam apparatus such as a scanning electron microscope or micro-analyser the scanning is done in at least three successive stages so that the angle of incidence of the beam on the specimen surface is constant during the scanning cycle. It can be varied at will and by rapid switching between two alternative angles and corresponding switching of the image-forming means, stereoscopic effects are obtainable.

5 Claims, 4 Drawing Figures

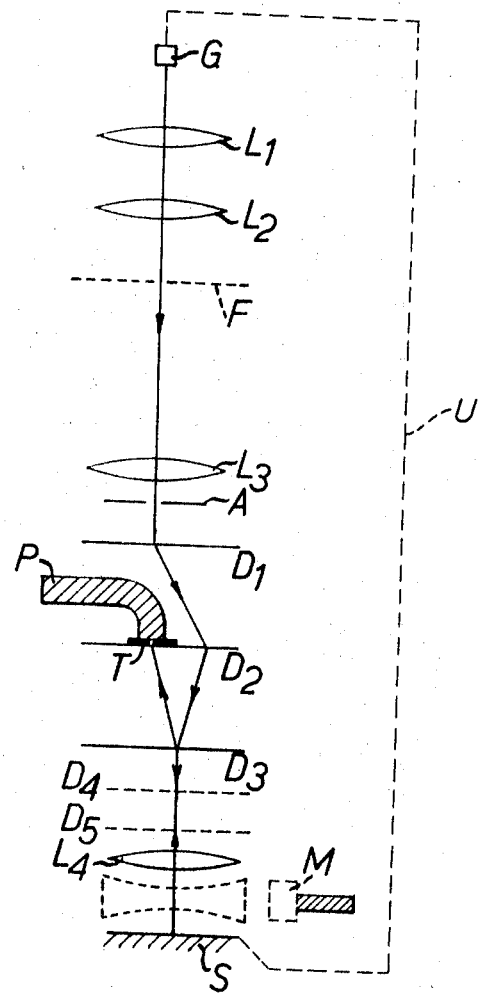

ELECTRON MICROSCOPY

This invention relates to apparatus in which an electron beam is caused to impinge on, or at least come under the influence of, the surface of a specimen under examination, the resulting effect of the specimen on the beam or on secondary electrons or other particles generated in the specimen by the beam being observed by means of detecting equipment. For example, in a scanning electron microscope the beam is focussed into an extremely fine probe that impinges on only a very small area of the specimen, for example having a diameter of the order of only a micron. Either the beam or the specimen is displaced laterally, usually in two mutually perpendicular directions to cause the beam to scan selected regions of the surface of the specimen in a raster and the secondary electrons that emanate from the specimen are collected by a detector and fed to the brightness control of a recorder such as a cathode ray tube of which the screen is scanned in synchronism with the electron beam. In this way an image is produced on the screen, showing the contrast resulting from variations in the topography, potential distribution, electric or magnetic field or other effects in the surface of the specimen.

Similarly, in a scanning X-ray microanalyser an electron beam, or so-called probe, is caused to scan a selected area of the surface of the specimen and the resulting X-rays that are given off by the specimen are analysed to show the composition of the surface.

Scanning by moving the specimen itself is severely limited in speed, and in practice it is generally preferred to deflect the beam. This can be done electrostatically or electromagnetically in a manner closely similar to that used in a cathode ray tube, using a pair of plates or coils for each of the two mutually perpendicular directions of deflection. However with this simple arrangement the deflecting system cannot be used in conjunction with a final objective lens which, for reasons which need not be discussed here, has a very small aperture stop through which the beam must pass and at the same time the lens must be of short focal length, and therefore close to the specimen. Duncumb has overcome this difficulty and has enabled the deflecting system to be within or ahead of the final lens by using a double deflection system for each direction, in which the beam is deflected first one way and then the other so that, although its inclination is altered during scanning, it always passes through the centre of the aperture in the final lens. Thus the beam appears, at the specimen, to be oscillating about a point in the centre of this final aperture.

The aim of the present invention is to provide a particularly flexible and complete control over the manner in which the beam approaches and/or impinges on the surface of the specimen, in particular its angle of incidence which, in known arrangements, varies during the scanning movement, especially where the scanning amplitude is large.

According to the invention interrelated means are provided for deflecting the beam, in a given deflection plane, at least three successive points in the path of the beam. As will become apparent from the description which follows, this allows the beam to scan back and forther over the selected region of the specimen while remaining at all times normal to the surface. Alternatively it may scan back and forth at a constant angle other than 90°. By performing two scans at two different angles stereoscopic effects are obtainable.

Normally, where the beam scans an area of the specimen in a rectangular raster, the beam being deflected in two mutually perpendicular planes, this three-stage scanning will be applied independently to both scanning directions.

The invention will now be further described by way of example with reference to the accompanying drawings, in which:

FIG. 4 illustrates more fully, but in diagrammatic form, a further application of the invention.

Figure 1:
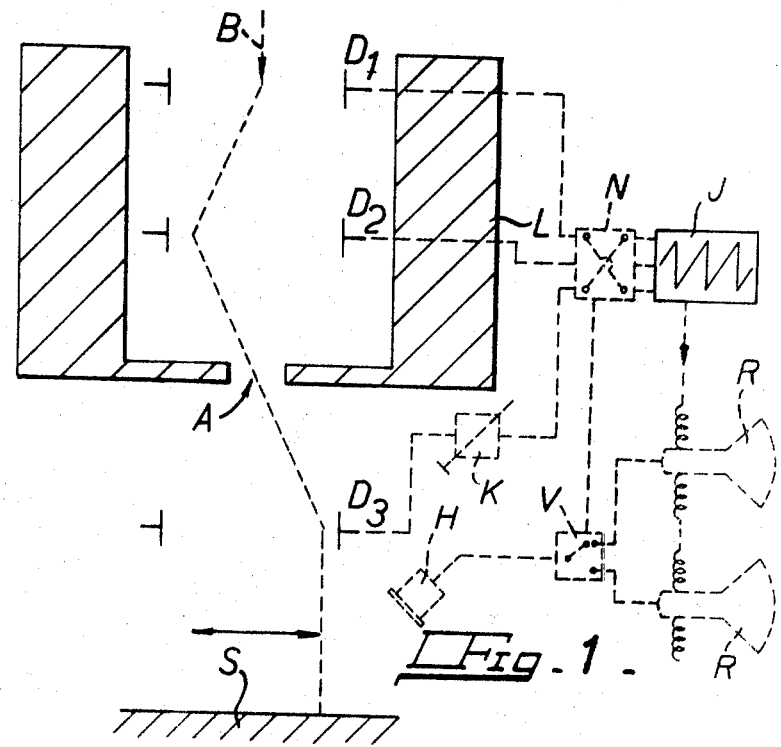
FIG. 1 illustrates diagrammatically the basis of the invention.

In the instrument illustrated in FIG. 1 the electron gun at which the electron beam is generated is not shown, nor the first lens, but only the beam itself at B, the final objective lens L and a specimen S under examination. The detector which picks up the secondary electrons or the back-scattered electrons or other radiation, such as X-rays, resulting from the impact of the electron beam B on the specimen S is shown at H.

To cause the beam to scan a region of the specimen in the plane of the drawing we provide a deflection system comprising three separate stages D1, D2 and D3, all coupled together. They are indicated purely diagrammatically as pairs of plates and in fact they could be electrostatic but they are preferably electromagnetic, in the form of pairs of coils. They are most conveniently coupled simply by connecting them all in series so that they all carry the same current. The stage D1 deflects the beam in one direction and the next stage D2 deflects its back again by twice the amount; this can be achieved by giving the coils of stage D2 twice as many turns as those of D1. Then, as the current in the coils varies, the beam is deflected to a great or lesser extent from its straight-line path, but, if the stage D2 is midway between the stage D1 and an aperture A in the final objective lens L, the beam will always pass through the center of that aperture. Thus the aperture can be very small (which is desirable for reasons which need not be discussed here) without restricting the scanning amplitude.

The stage D3 then deflects the beam back again until it is parallel to its original path but laterally displaced from it. It is generally possible to accommodate this single pair of coils between the final aperture A and the surface of the specimen S despite the shortness of this distance.

In the example described the coils of stage D3 will have the same number of turns as the coils of stage D1. However it will be understood that the number of turns in the three stages can be adjusted as desired according to their spacing, along the axis of the beam, in relation to each other and to the aperture A. Also they could be connected in parallel rather than in series.

If a sawtooth waveform is fed to the three deflection stages D1, D2 and D3 from driving means J, the beam B will scan back and forth along a line on the surface of the specimen, but throughout the scanning movement the beam will impinge on the specimen in a direction normal to the specimen surface. This ensures that any effects, especially those of surface topography, in which the response is dependent on the angle of incidence of the beam are not masked or falsified by variation of that angle during scanning.

It should perhaps be made clear here that the angles of deflection and the amplitude of movement have been grossly exaggerated for purposes of illustration. In practice, in a typical example the point of impact of the beam on the specimen will only be a little over one micron in diameter and the total amplitude of scan at the specimen surface will be a few hundred microns.

For scanning a rectangular area of the specimen there will normally be a second deflection system deflecting the beam in a plane perpendicular to the plane of the drawing and fed with a saw-tooth signal having a frequency, for example, three hundred times lower than that of the first mentioned system, to give a 300-line scan.

It is by no means essential that the beam should impinge on the specimen surface in a perpendicular direction. On the contrary, by appropriately controlling the relative currents in the three deflection stages it is possible to cause the beam to impinge on the specimen at any desired angle over a range, this angle remaining constant over the whole width of the scan. This is indicated diagrammatically in FIG. 2. The control equipment necessary to do this need not be described as its construction will be readily apparent to those skilled in the art. It will be clear that the user of the apparatus can have under his control a knob as indicated at K in FIG. 1 which, by appropriate adjustment of the relative currents in the three deflection systems, allows him to select any desired impingement angle over a range which may, for example, extend up to 20° each side of the normal.

The facility allows the examination, at varying angles, of particular specimen surfaces, for example those involving steps, with particular ease, and without the need, hitherto present, to tilt the specimen itself at varying angles to the beam.

There could even be four or more successive deflection stages but three give all the flexibility in control that is normally needed.

Figures 2, 3:
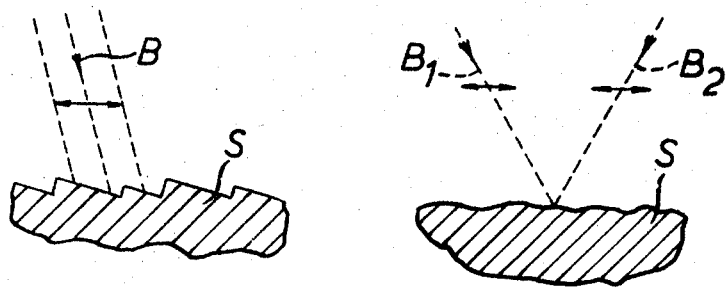
FIGS. 2 and 3 are sketches illustrating particular uses of the invention.

In a further refinement, illustrated diagrammatically in FIG. 3, the beam is switched between two opposing inclinations, indicated at B1 and B2 by switching means indicated in broken lines at N in FIG. 1. If this switching is done rapidly and if the signal from the detecting device is switched in synchronism alternately to two display devices indicated at R in FIG. 1, by means of a switch V coupled to the switching means N, it is possible to display a pair of images bearing a stereoscopic relationship to each other. If these images are then combined in the usual manner a full stereoscopic picture of the specimen surface is obtained. The switching by the switching means N can be done for example between the alternate lines of the scan or, where the scanning is sufficiently rapid, between alternate frames.

FIG. 4 shows another use for the invention, namely, in a novel form of mirror electron microscopy. In conventional mirror electron microscopy a diffuse beam of electrons is allowed to approach the specimen but the specimen is held at a potential equal to or even slightly negative with respect to the electron gun at which the beam was generated, (as indicated by the connection shown in broken lines at U) and so the motion of the electrons is retarded by the electrons by the field close to the specimen surface to such an extent that they are brought to a halt and actually accelerated away from the surface without having entered it. The electrons are strongly influenced by any electric or magnetic field present as they are moving slowly close to the specimen surface and so the direction in which they move away is dependent on these fields and if the returning electrons are collected it is possible to form an image from them, containing information about the fields at the specimen surface.

The apparatus of FIG. 4 operates on the same principle but uses a finely focussed probe which scans an area of the specimen in a time-sequential manner and the image is formed on the screen of a synchronised cathode ray tube. Thus the difference is analogous to that between conventional scanning electron microscopy and conventional conjugate image electron microscopy.

The electrons generated at an electron gun G pass through the usual lenses L1 and L2, which may be electrostatic or electromagnetic (they are illustrated for convenience like optical lenses) and are focussed into a fine probe by an objective lens L3 with an aperture A. The electron beam or probe then passes through a triple deflection system D1, D2, D3 of the kind described earlier and a final converging lens L4 to approach the specimen S. The specimen S, held at a voltage equal to or slightly negative with respect to the gun G, acts as a mirror and the electrons, in the absence of any disturbing field, return along the path by which they came, at least until they reach the deflection stage D3. Assuming the deflection system is electromagnetic rather than electrostatic these electrons, moving now in the opposite direction, will be deflected the opposite way, as indicated, and are picked up by a scintillator T from which a light pipe P leads to a photo-electric cell (not shown), that gives an electrical signal dependent on the number of electrons picked up. This signal controls the brightness of a cathode ray tube display scanned in synchronism with the electron beam. In regions of the specimen where there is a distorting electrical or magnetic field the electrons will be deflected and will not enter the aperture of the scintillator, so there will be a change in signal and in this way the picture appearing on the screen of the cathode ray tube will give information on the field distribution in the specimen.

Thus in the apparatus of FIG. 4 the triple-scanning system of the invention is being employed to deflect the beam without tilting it, as in the arrangement of FIG. 1, but for the purpose of enabling the beam to follow a lath that goes round the scintillator T on the outward journey, but into the scintillator on the return path.

In a modification the deflection system could be electrostatic and would still serve to guide the incident beam around the scintillator but in that case a separate electromagnetic deflection would have to be introduced to divert the returning beam from the path of the incident beam.

In FIG. 4 we have indicated a divergent lens adjacent to the specimen S. This is not an actual lens but is there to indicate the fact that the specimen in acting as a mirror, acts as a weakly divergent element that helps to counteract the distortions of the convergent final lens.

The apparatus of FIG. 4 may also be employed as a conventional mirror microscope by omitting the scanning and inserting a fluorescent screen at F, and eliminating the scanning and probe-forming systems, and it may be used as a conventional scanning microscope by switching off the triple scanning system and using a conventional system inserted at D4 and D5, and a scintillator or other detector device at M.

We claim:

1. Electron beam mirror microscopy apparatus comprising means for generating and forming an electron beam, means for holding a specimen at an electric potential close to the potential of said beam-generating means, such that electrons of said beam are subjected to a retarding and reversing action on approaching said specimen, means for deflecting said beam laterally such as to cause said beam to scan a region of the surface of said specimen, and means for detecting electrons reversed by the action of said specimen, said deflecting means comprising at least three discrete deflecting stages spaced apart along the path of said beam and placed such as to cause said beam to be deflected in a non-linear path around said detecting means.

2. Electron beam apparatus as set forth in claim 1 wherein at least that stage of said deflection means which is traversed last by said beam is electromagnetic, such as to divert said reversed electrons into a path differing from that of said beam.

3. Electron beam apparatus comprising means for forming an electron beam, deflecting means for causing said beam to scan a region of a specimen surface, driving means coupled to said deflection means, detecting means observing the results of the mutual influence of said beam and specimen surface, said deflecting means comprising at least three discrete deflection stages spaced apart along the path of said beam, switching means coupled to said driving means and to said detecting means and serving to cause said beam to impinge on said specimen surface at two alternate angles, the detecting means comprising means for producing two stereoscopically related images of said specimen surface in response to the effect of said beam on said surface at the two angles respectively under the control of said switching means.

4. Electron beam apparatus comprising means for forming an electron beam, final lens means focusing said beam on the surface of a specimen placed in the path of said beam, said final lens means defining a final aperture, deflecting means for causing said beam to scan a region of said specimen surface, and detecting means observing the results of the mutual influence of said beam and specimen surface, said deflection means comprising at least three discrete deflection stages of which first and second stages lie in the path of said beam ahead of said final aperture and act in opposite directions on said beam such as to cause said beam to pass through a substantially fixed point in said final aperture and a third one of said stages lies in the path of said beam following said final aperture.

5. Electron beam apparatus as set forth in claim 4 wherein said third one of said stages is energised to act on said beam in such a direction as to deflect said beam into a path parallel to the initial direction of said beam prior to its deflection by said deflection means.

* * * * *